United States Patent [19]

Bourne

[11] 3,977,204

[45] Aug. 31, 1976

[54] ALCOHOL CIRCULATION SYSTEM

[75] Inventor: Joseph R. Bourne, Dewitt, N.Y.

[73] Assignee: Carrier Corporation, Syracuse, N.Y.

[22] Filed: Nov. 14, 1975

[21] Appl. No.: 631,982

[52] U.S. Cl. .................................. 62/85; 62/112; 62/476; 62/486
[51] Int. Cl.² ..................... F25B 47/00; F25B 15/00
[58] Field of Search ............... 62/85, 101, 102, 112, 62/476, 486

[56] References Cited
UNITED STATES PATENTS

| | | | |
|---|---|---|---|
| 1,477,127 | 12/1923 | Kasley | 62/85 |
| 1,996,094 | 4/1935 | Backstrom | 62/486 |
| 2,059,877 | 11/1936 | Kogel | 62/486 |
| 2,072,144 | 3/1937 | Ullstrand et al. | 62/486 |
| 2,551,666 | 5/1951 | Gilmore | 62/85 |
| 3,605,873 | 9/1971 | Leonard, Jr. | 62/476 |

Primary Examiner—Lloyd L. King
Attorney, Agent, or Firm—J. Raymond Curtin; Thomas J. Wall

[57] ABSTRACT

An alcohol circuit for use in an absorption refrigeration system for circulating alcohol through the system along an independent path of travel which prevents the alcohol from stagnating within the evaporator section of the system. Further means are provided to precondition the alcohol prior to its introduction into the absorber section to enhance the effective use of this additive within this section.

17 Claims, 3 Drawing Figures

ALCOHOL CIRCULATION SYSTEM

BACKGROUND OF THE INVENTION

This invention relates to means for circulating alcohol within an absorption refrigeration system.

Alcohol is added to the working fluids employed in many absorption refrigeration systems to achieve a level of performance that is substantially greater than normally attainable in a conventional system employing a refrigerant-solution combination. The exact mechanism by which this gain is attained is not, as yet, fully understood. However, the effect of alcohol upon the system can be dramatically demonstrated in practice.

The gain that is realized by the use of alcohol in the working fluids of the system is generally lost over a period of time. It is believed that the alcohol stagnates in certain parts of the system and, as the process continues, less alcohol becomes available to enhance performance. It has heretofore been the practice to correct the system by simply adding more alcohol to the working fluids when the system performance falls below some predetermined value. This practice, however, has never been found to be satisfactory in that it requires a continuous monitoring of the system, results in an unwanted buildup of alcohol within the equipment, and produces undesirable variations in the overall performance of the system.

SUMMARY OF THE INVENTION

It is therefore an object of the present invention to improve the operation of absorption refrigeration systems.

It is a further object of the present invention to establish an independent flow path for alcohol within an absorption system to promote continuous circulation of the alcohol through the system.

A still further object of the present invention is to more efficiently utilize alcohol within an absorption refrigeration system.

Yet another object of the present invention is to prevent stagnation of alcohol within an absorption refrigeration system.

Another object of the present invention is to stabilize the performance of an absorption refrigeration system using an alcohol additive.

These and other objects of the present invention are attained by separating the condensate discharge from the condenser section of an absorption refrigeration system, delivering the separated alcohol into the absorber section of the system and delivering the remaining condensate into the evaporator section of the system whereby the alcohol is circulated through the system along an independent path of travel which circumvents the evaporator section and thus substantially reduces alcohol stagnation within the system.

BRIEF DESCRIPTION OF THE DRAWINGS

For a better understanding of the present invention, as well as other objects and further features thereof, reference is had to the following detailed description of the invention to be read in connection with the accompanying drawings, wherein.

DESCRIPTION OF THE PREFERRED EMBODIMENT

Figure 1:
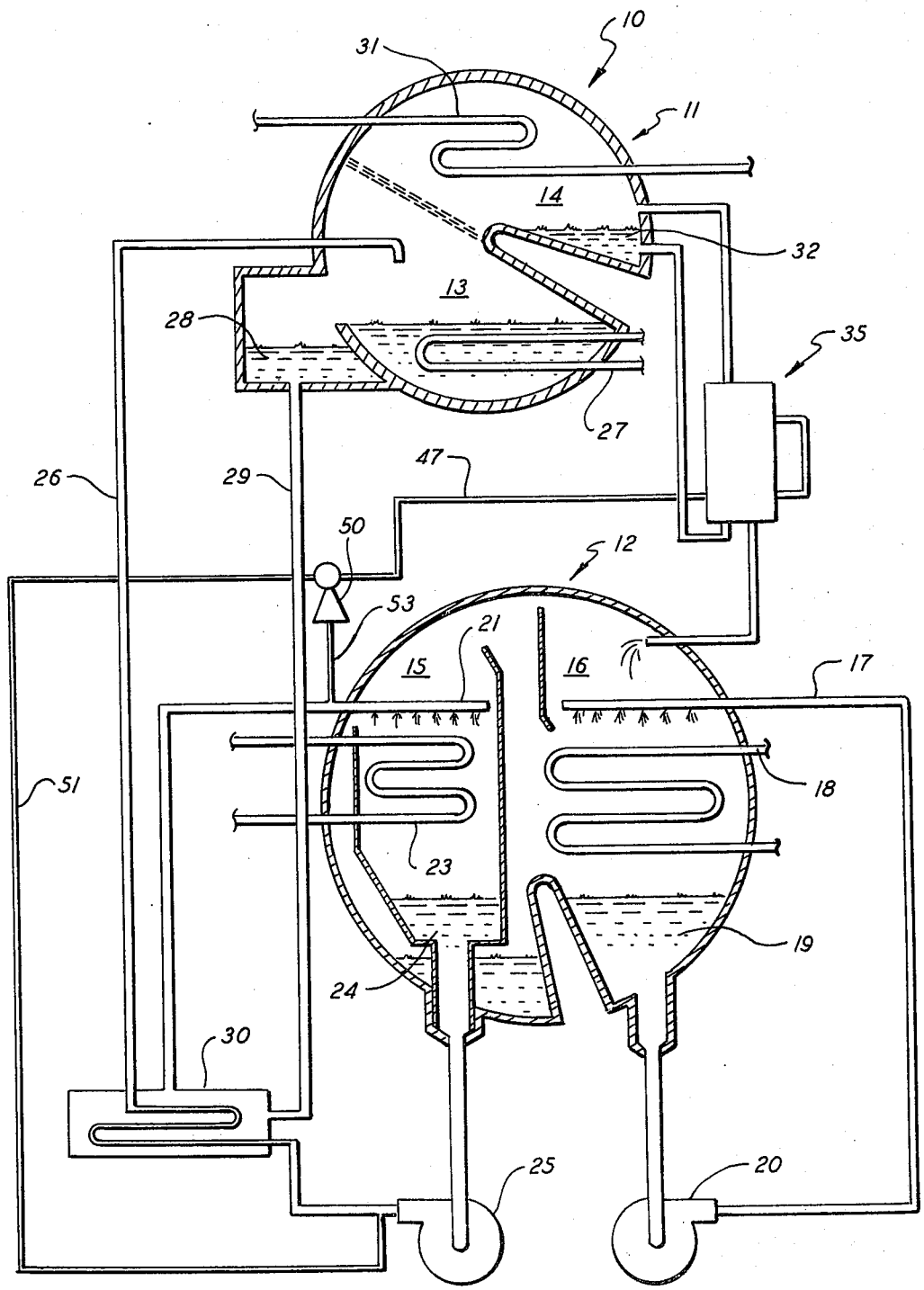
FIG. 1 is a schematic representation of an absorption refrigeration system utilizing the teachings of the present invention wherein alcohol is separated from refrigerant discharged from the system's condenser and the separated alcohol pumped into a solution spray header located within the absorber section.

The present invention shall be herein described in reference to a conventional absorption refrigeration system utilizing lithium bromide as an absorptive solution and water as the refrigerant. It should be understood, however, that the teachings of the present invention are not necessarily limited to this specific environment and, as will become apparent from the description below, the invention has broader application within the art. A conventional absorption machine 10, utilizing a lithium bromide cycle, is illustrated in FIG. 1. Basically, the main machine components include an upper shell 11 and a lower shell 12. The upper shell contains a generator section 13 and a condenser section 14, while the lower shell contains an absorber section 15 and an evaporator section 16.

The lower shell is generally evacuated to about 0.25 inch of mercury absolute and refrigerant sprayed into the evaporator section by means of a header 17 arranged to direct the refrigerant over a tube bundle 18 through which a substance to be chilled is passed. At this low pressure, water (refrigerant) boils at about 40°F and thus is caused to evaporate upon the tube bundle to absorb energy (heat) from the substance passing therethrough. Refrigerant vapors generated as a result of the evaporation process are permitted to pass through a baffle network directly into the absorber section of the lower shell. Liquid refrigerant, which remains behind in the evaporator, is collected in the lower sump 19 from where it is recycled through the refrigerant spray header by means of a refrigeration pump 20.

Water vapors entering the absorber are exposed to a strong or concentrated solution of lithium bromide which is discharged from a second solution spray header 21. As a result, the vapors are absorbed by the lithium bromide and rapidly reduced to a condensate. The heat of condensation generated during the absorption process is carried out of the system by means of a coolant, such as water, passing through heat exchanger 23 over which the absorptive solution is sprayed. Diluted solution passes to the bottom of the absorber and is collected in reservoir 24.

The primary function of the sections located in the upper shell is to sustain the absorption process. In operation, dilute solution is pumped, via solution pump 25 and line 26, through a tube loop located within the heat exchanger 30 into the generator section of the upper shell. The weak solution is heated in the absorber section by means of a steam loop 27 or any other suitable heating means. The upper shell is maintained at a relatively low pressure, normally about 3 inches of mercury absolute, whereby the refrigerant contained in the weakened solution is readily boiled or driven out of solution at the relatively low pressures involved thus reconcentrating the solution. Reconcentrated solution is collected within chamber 28 and gravity fed therefrom back to the absorber section by means of supply line 29. The supply line passes the solution into the shell side of heat exchanger 30 from where it is delivered into the solution spray header 21 for reuse in the absorption process. In the exchanger 30, the strong solution gives up some of its energy to the weak solution as the weak solution is pumped from the absorber section into the generator section thereby improving the efficiency of the cycle.

The refrigerant vapors driven from the lithium bromide solution within the generator are permitted to pass directly into the condenser section where the vapors pass over a condenser coil 31. Cooling water is passed through the condenser coil which serves to reduce the vapors to a liquid condensate. The heat of condensation is carried out of the system by the cooling water and eventually discharged into a heat sump. The condensate formed in the condenser is collected within the condenser sump 32. Normally, in a conventional system, the condensate generated within the condenser, which contains both alcohol and refrigerant, is fed directly back to the evaporator section.

As conventionally practiced in the art, alcohol is simply added to the working fluids contained within the system. As a consequence, the alcohol is allowed to follow the normal flow path of fluids through the system in an uncontrolled manner. Tests have been shown that the presence of alcohol within the evaporator section of the system, if anything, has a somewhat adverse effect upon evaporator performance. On the other hand, the presence of alcohol in the absorber section, particularly when in a vaporized form, greatly enhances the overall performance of the system.

The presence of alcohol in the evaporator also gives rise to an unwanted occurrence which has a serious adverse effect on system performance. Because of the relatively low temperature in the evaporator, a portion of the alcohol in this section is liquefied along with the refrigerant and deposited within the sump area. The liquid alcohol, being less dense than the refrigerant, rises to the surface of the refrigerant pool maintained in the sump and thus tends to stagnate in this particular region. Accordingly, less alcohol becomes available in other sections. As more liquid alcohol stagnates in the evaporator, the system's performance falls off until ultimately the gain is reduced to zero. Although more alcohol can be added to the system to bring the performance back to a high level, the stagnation process continues which results in an unwanted buildup of alcohol within the evaporator.

Figure 2:
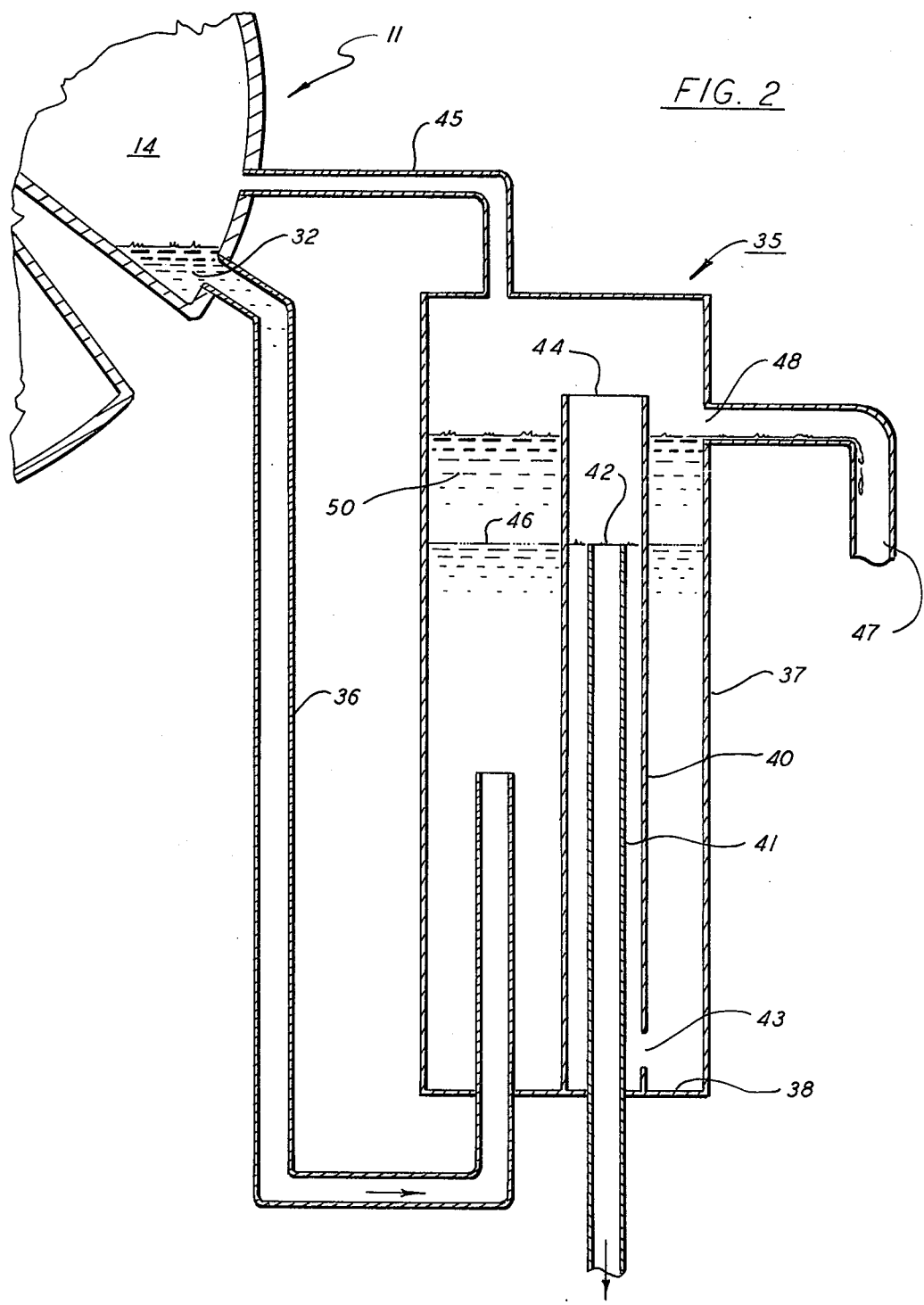
FIG. 2 is a partial view in section showing the construction of the device employed for separating alcohol from the refrigerant discharged from the condenser section illustrated in FIG. 1.

A separator unit 35 is operatively connected to the condensate discharge line 36 of the system condenser. As best illustrated in FIG. 2, the separator includes a holding tank 37 of any suitable cross-sectional configuration that is arranged to receive a continuous flow of condensate discharged from the condensate discharge line. The internal volume of the tank is sized so that the tank appears as a sudden enlargement to the entering fluids. In accordance with the relationship governing the flow of fluids into an enlarged area, the volume rate of flow of the entering condensate is rapidly dissipated within the tank to produce relatively quiet flow conditions. To further promote quiescence within the tank, the discharge end of line 36 is brought through the bottom wall 38 of the tank and raised to an elevation whereby the condensate is expelled into the main body of liquid contained within the tank.

A vertically aligned refrigerant trap 40 is secured in fluid-tight relation, as for instance by welding, to the bottom wall of the tank. The refrigerant trap extends upwardly within the tank to a predetermined elevation. Passing upwardly within the trap is a smaller refrigerant discharge line 41 that terminates with an opening 42 positioned below the top surface of trap 40. The refrigerant discharge line passes through the bottom wall of the tank and, as best seen in FIG. 1, empties directly into the evaporator section of the refrigeration system.

A port 43 is provided in the side wall of the trap adjacent to the bottom wall of the holding tank. The denser liquid refrigerant, which collects in the bottom of the tank, is allowed to pass freely from the main body of the tank into the trap via the port. In operation, the separator is located slightly below the condenser sump to permit the mixture of liquid refrigerant and alcohol to be gravity fed into the tank from the condenser. Because of the quiescent flow conditions maintained within the tank, the less dense alcohol rises to the surface of the more dense refrigerant. As noted, the heavier refrigerants at the bottom of the tank are allowed to pass directly into the trap whereby the trap also fills with refrigerant. The top surface of the trap is provided with an opening 44 to equalize the tank pressure and trap pressure. When the refrigerant in the trap reaches the elevation of the opening 42 formed in the refrigerant discharge line, any addition of refrigerant into the tank will cause refrigerant to flow out of the discharge line and be gravity fed directly into the evaporator section. To insure that the pressure in the separator does not fluctuate, a pressure equalizing line 45 is arranged to pass between the top surface of the holding tank and the condenser section.

An alcohol discharge line 47 is adapted to pass through the side wall of the separator tank. The line has an opening 48 formed therein which is positioned at an elevation which is slightly higher than the surface level 46 of the refrigerant maintained within the tank but below the pressure equalizing openings 44 situated in the top of the trap. A layer 50 of alcohol is thus collected upon the surface of the refrigerant contained in the tank. As more alcohol is collected upon the surface of the refrigerant, the alcohol flows out of the tank via the alcohol discharge line 47. As can be seen, the separator functions to isolate the alcohol from refrigerant collected in the tank and to permit removal of the separated fluid along independent paths of travel.

As noted above, the separated refrigerant is delivered directly into the evaporator section via line 41 (FIG. 1). The separated alcohol, on the other hand, is bypassed around the evaporator and eventually delivered into the absorber section. By so bypassing the evaporator, the stagnation problem heretofore encountered in most absorption refrigeration systems is avoided and, any adverse effects of alcohol upon the evaporator performance eliminated. As a result, a dramatic improvement in overall system performance is realized.

It has been found that one of the most advantageous means of introducing alcohol into the absorber section is by means of the solution spray header. In practice, the separated alcohol is pumped to a higher pressure and discharged from the pump into solution passing into the header. By raising the pressure in the alcohol flow and entraining the fluid within the higher temperature solution, vaporization of the alcohol is promoted as it is issued from the spray nozzles into the absorber.

While it is desirable to introduce alcohol into the solution spray header, the amount of head available within the separator alcohol discharge circuit is normally not adequate enough to attain the desired results. As illustrated in FIG. 1, a small jet pump 50 is operatively connected within the alcohol discharge line 47 leaving the separator which functions to provide the required head necessary to introduce the alcohol into the spray header line. In the present arrangement, the solution passing through the system is utilized as a motive fluid to drive the jet pump. A solution line 51 is arranged to divert a small portion of the solution leaving the solution pump 25, which is operatively connected to the absorber section, and deliver the diverted flow directly to the jet pump. As is well known, the jet pump utilizes the energy of the motive fluid to create a high velocity flow through a nozzle or diffuser creating a suction to draw the suction fluid, in this case alcohol, through the pump. The solution and the alcohol are mixed thoroughly within the pump and discharged against the counterpressure in the solution spray header via line 53. As a result, the alcohol is entrained in the higher temperature solution and preheated prior to reaching the header nozzles. As the mixture issues from the spray header nozzles, the alcohol is expanded into the lower pressure absorber shell thereby promoting vaporization of the fluid. The solution header is positioned directly above the heat exchanger bundle contained in this section and is arranged to direct a well distributed flow of fluids thereover. The alcohol, entrained in the higher temperature solution, is thus placed in a condition to most efficiently increase the effectiveness of the absorber and is well disbursed over the exchanger.

Figure 3:
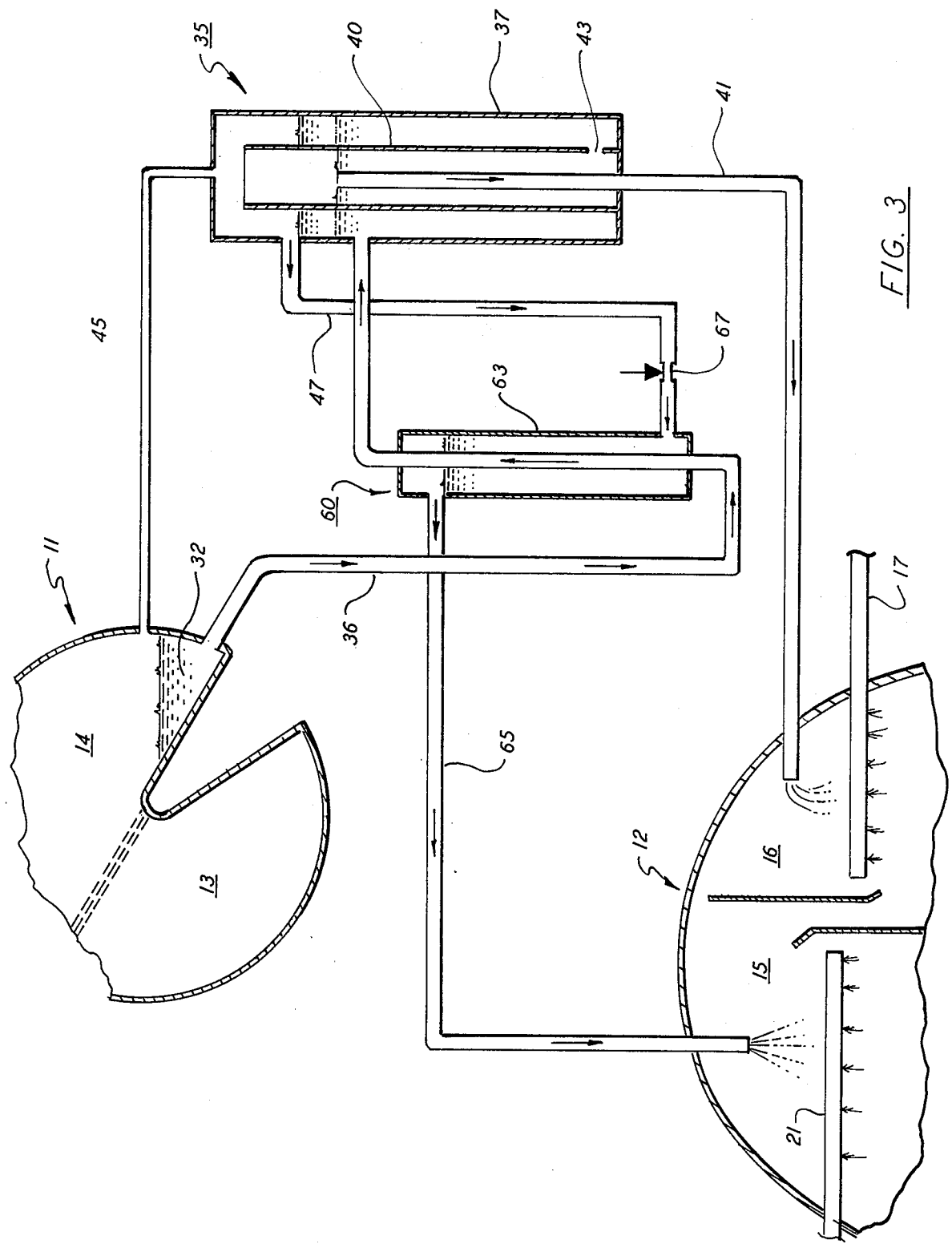
FIG. 3 is a schematic representation of an absorption system utilizing the teachings of the present invention wherein alcohol is separated from the refrigerant discharged from the condenser section of the system and the separated alcohol preheated prior to introducing the alcohol into the absorber section.

Generally, in an absorption system, the condensate leaving the condenser section contains energy in the form of heat which is normally wasted. Referring now to FIG. 3, there is shown a second embodiment of the present invention in which this normally wasted energy is utilized to vaporize alcohol leaving the separator prior to its introduction into the absorber. As illustrated, the condensate line 36 leaving the condenser passes through heat exchanger 60 before the condensate is delivered into the separator tank 37. The alcohol discharge line 47 leaving the separator is brought into the bottom of the exchanger shell 63. In the exchanger, heat is transferred from the high temperature condensate passing through line 36 to the alcohol contained within the shell. Because of the low pressures involved, the alcohol is caused to evaporate. The evaporated alcohol is carried out of the exchanger via line 65 and delivered into the absorber section where it is discharged directly into the stream of solution issuing from the solution spray header 17. The vapor line 65 is arranged so that liquid alcohol can also be drained, under the influence of gravity, into the absorber when the amount of heat energy available in the condensate falls to a level that is inadequate to sustain complete vaporization of the additive. Any liquid passed into the absorber section with the vapor will be exposed to the relatively hot solution issuing from the spray header and thus tends to vaporize in the absorber.

Preferably, the alcohol entering the alcohol heat exchanger is expanded from the higher condenser pressure to the lower absorber pressure to enhance the vaporization process. Expansion is accomplished by means of a throttling plate 67, or any other suitable device, positioned in the alcohol discharge line 47 running between the separator and the alcohol heat exchanger.

As can be seen from the discussion above, the apparatus of the present invention is designed to create an independent flow path circuit for alcohol passing through the absorption system which, in effect, bypasses the evaporator section. The alcohol traveling through this circuit is acted upon so as to place the alcohol in a vaporized state prior to its entering the absorber section. As a result, alcohol stagnation problems are substantially avoided, a more effective utilization of the additive is realized in the absorber section, and a more complete circulation of alcohol through the system is obtained.

While this invention has been described with reference to the structure herein disclosed, it is not confined to the details as set forth, and this application is intended to cover any modifications or changes as may come within the scope of the following claims.

What is claimed is:

1. The method of circulating alcohol within an absorption refrigeration system having a condenser section, an evaporator section, and an absorber section, including the steps of
    separating alcohol from refrigerant discharged from the condenser section,
    delivering the separated refrigerant into the evaporator section, and
    delivering the separated alcohol into the absorber section whereby the flow of alcohol passing through the system bypasses the evaporator section.

2. The method of claim 1 further including the step of vaporizing the separated alcohol prior to delivering the alcohol into the absorber section.

3. The method of claim 2 wherein the separated alcohol is vaporized by passing said alcohol into heat transfer relationship with the higher temperature condensate discharged from the condenser section prior to the condensate entering the separator.

4. The method of claim 3 further including the step of expanding the separated alcohol from the condenser pressure to the absorber pressure prior to passing said alcohol into heat transfer relationship with said condensate.

5. The method of claim 1 wherein said separated alcohol is discharged directly into a stream of absorbent solution within the absorber section to promote distribution of the alcohol within said absorber section.

6. The method of circulating alcohol within an absorption refrigeration system of the type having a condenser section operatively connected to an evaporator section and an absorber section wherein refrigerant is exposed to an absorptive solution discharged therein, the steps including
    separating alcohol from refrigerant passing from the condenser section into the evaporator section,
    delivering the separated refrigerant into the evaporator section,
    pumping the separated alcohol into a flow of concentrated solution passing into the absorber section whereby the alcohol is mixed with solution, and
    spraying the mixture into the evaporator whereby the alcohol in the mixture is vaporized.

7. The method of claim 6 further including the step of directing the sprayed mixture directly at an absorber heat exchanger contained within the absorber section to provide even distribution of the mixture over said exchanger.

8. The method of claim 7 further including the step of passing the mixture through a series of nozzles within the absorber section to promote vaporization of the alcohol discharged into the absorber section.

9. In an absorption refrigeration system of the type having a generator section, a condenser section, an evaporator section and an absorber section, which utilizes an alcohol additive within the working fluids contained therein, the improvement comprising a separator operatively connected to the discharge of said condenser section for removing alcohol from the refrigerant discharged from said condenser section, means for delivering the separated refrigerant into the evaporator section of the system, and means to deliver the separated alcohol into the absorber section of said system.

10. The apparatus of claim 9 wherein said separator is positioned at an elevation intermediate the condenser section and the absorber and evaporator sections whereby the condensate from the condenser is gravity fed into the separator and the separated alcohol and refrigerant are gravity fed from the separator into the absorber section and the evaporator section, respectively.

11. The apparatus of claim 9 further including heating means operatively connected to the means for delivering separated alcohol into the absorber section to raise the temperature of the separated alcohol to a level whereby the alcohol is vaporized prior to delivery into the absorber section.

12. The apparatus of claim 11 wherein said heating means comprises a heat exchanger arranged to bring the condensate discharged from the condenser section into heat transfer relationship with the separated alcohol discharged from the separator.

13. The apparatus of claim 12 further including an expansion means for throttling the separated alcohol discharged from the separator to absorber pressure prior to the alcohol entering the heat exchanger.

14. Apparatus for circulating alcohol within an absorption refrigeration system having a condenser section operatively connected to an evaporator section and an absorber section including a separator operatively connected to the condenser section for receiving condensate from the condenser and separating alcohol from refrigerant, means for delivering separated refrigerant from the separator into the evaporator section, and a pump for drawing separated alcohol from the separator and discharging said alcohol into the absorber section.

15. The apparatus of claim 14 wherein said pump is arranged to discharge alcohol into a flow of absorptive solution discharged into the absorber section.

16. The apparatus of claim 15 wherein said pump is a jet pump utilizing said absorptive solution as a motive fluid.

17. The apparatus of claim 16 wherein the mixture of absorptive solution and alcohol is discharged into the absorber section through a series of nozzles for promoting expansion of the alcohol entering the absorber section.

* * * * *